United States Patent [19]

Bales

[11] Patent Number: 4,517,886
[45] Date of Patent: May 21, 1985

[54] GREASE COLLECTION SYSTEM FOR RANGE

[75] Inventor: Michael E. Bales, New Palestine, Ind.

[73] Assignee: The Maytag Company, Newton, Iowa

[21] Appl. No.: 621,736

[22] Filed: Jun. 18, 1984

[51] Int. Cl.³ .............................................. A47J 37/10
[52] U.S. Cl. ....................................... 99/425; 99/446; 126/41 R
[58] Field of Search ................ 126/21 R, 21 A, 41 R, 126/51, 19 R, 273 R, 1 R, 1 E; 99/340, 425, 444, 446

[56] References Cited

U.S. PATENT DOCUMENTS

| | | | |
|---|---|---|---|
| 2,283,853 | 5/1952 | Frick | 126/41 |
| 2,345,480 | 3/1944 | Jones | 99/425 |
| 2,691,369 | 10/1954 | Rutenber | 99/446 X |
| 2,720,827 | 10/1955 | Del Francia | 99/444 |
| 2,766,683 | 10/1956 | Kanz | 99/425 |
| 2,879,708 | 3/1959 | Cripe | 99/425 |
| 3,098,477 | 7/1963 | Lotter | 126/41 R |
| 3,444,805 | 5/1969 | Happel et al. | 99/340 |
| 3,474,724 | 10/1969 | Jenn | 126/41 R X |
| 3,805,688 | 4/1974 | Grozdjak | 99/425 |

Primary Examiner—Margaret A. Focarino
Attorney, Agent, or Firm—Richard L. Wardd

[57] ABSTRACT

A grease collection system is provided for a range which includes grilling capability. A collection container is located in the inner panel of the range generally adjacent the oven cavity opening. The container is generally flush with the inner panel and includes a sight window for checking the grease level and a handle for assisting in installation and removal. The container is spaced from the sump area of the grilling unit and includes a front opening for controlled overflow.

12 Claims, 8 Drawing Figures

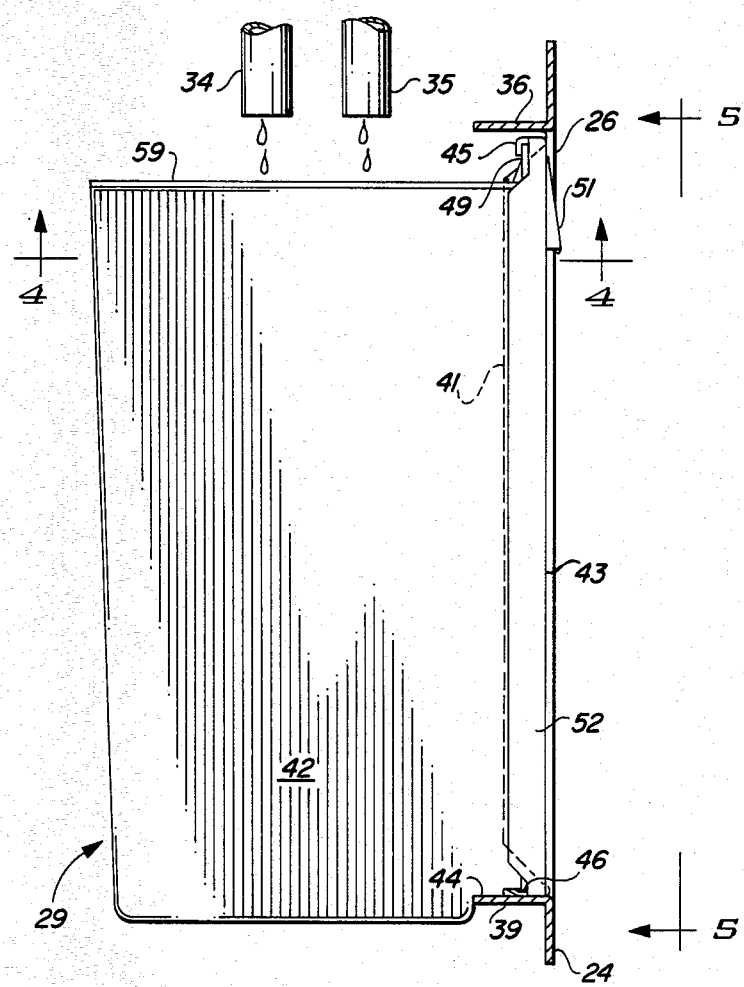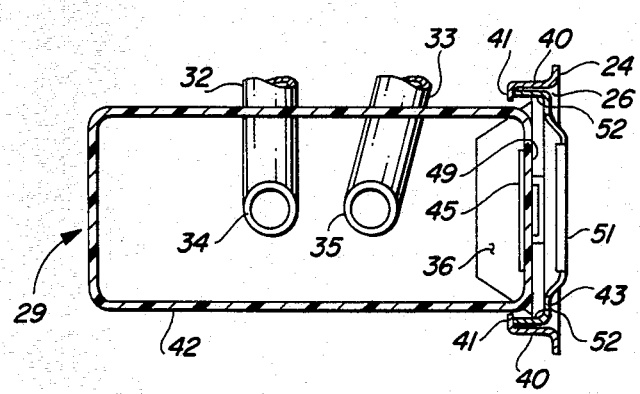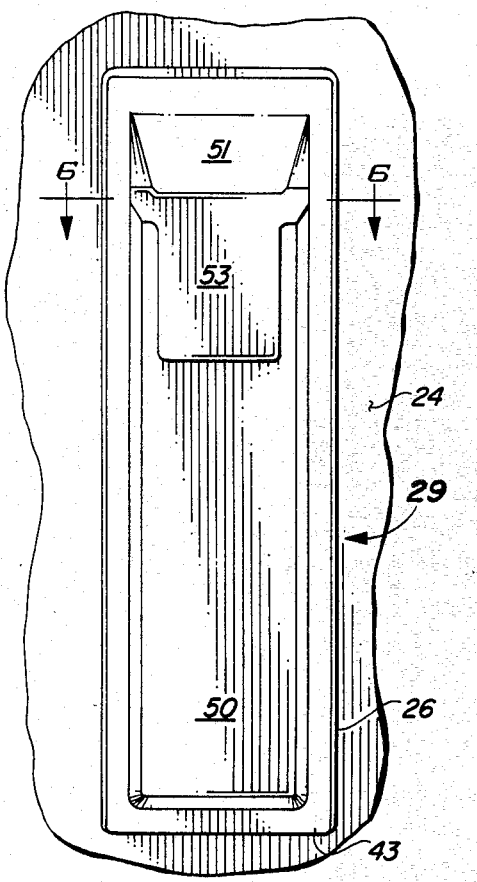

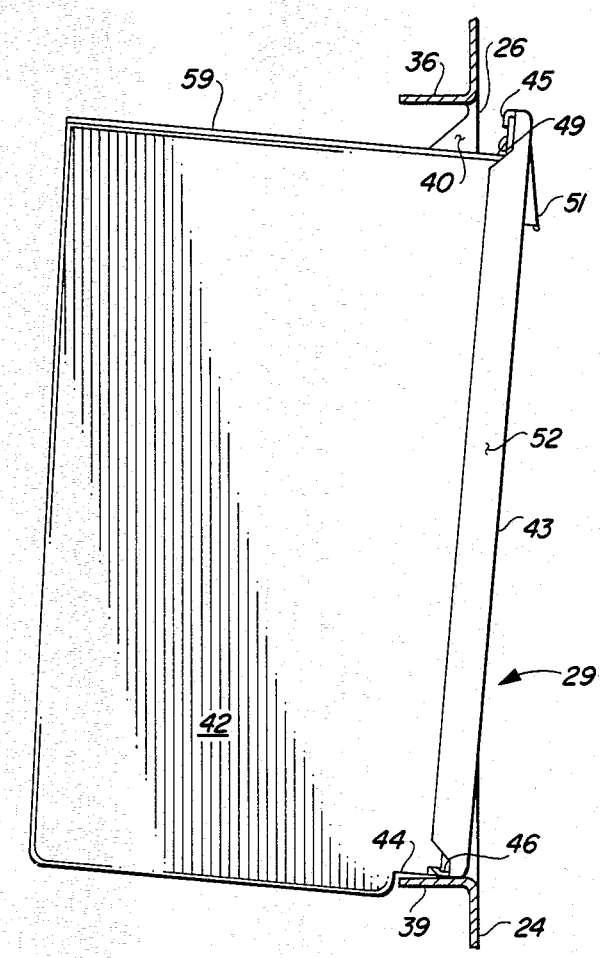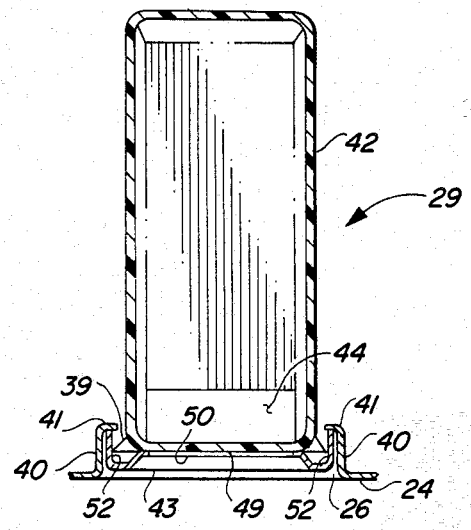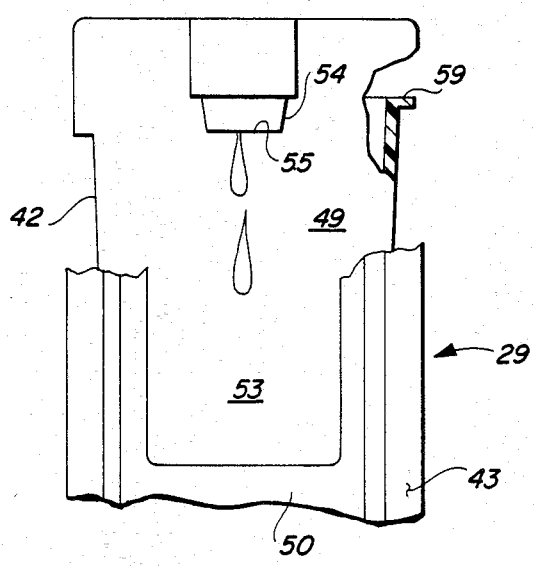

GREASE COLLECTION SYSTEM FOR RANGE

BACKGROUND OF THE INVENTION

This invention relates generally to the field of domestic ranges having food grilling capacity and in particular to an improved system for collecting the grease and other drippings generated during grilling. The system provides a collection container which is hidden from view when the oven door is closed and which is easily accessible for emptying when the oven door is open. The container includes a sight window for determining when it is full and an overflow aperture for allowing excess collected drippings to be directed down the front of the container so that they may be noted and easily cleaned up.

The prior art has included a variety of systems for collecting the grease from food which is broiled or grilled. In some electric ranges broiling takes place in the oven cavity subjacent the top heating element. In this broiling arrangement, the food is generally placed on a perforate sheet which overlies an imperforate pan. The grease passes through the sheet perforations and is deposited in the imperforate pan which must be emptied by the operator after the broiling operation is complete.

W. H. Frick, in U.S. Pat. No. 2,283,853 issued May 19, 1942, discloses a combination baking oven and top and bottom fired broiler. The baking oven is heated by the top broiler burner and the broiler pan and lower burner comprise a drawer unit which is independently movable. The broiler pan is sloped from rear to front toward a sump which drains into a removable grease reservoir. The front of the grease reservoir is openly visible and there is no provision for checking the grease level or for directing any overflow of grease.

J. A. Del Francia, in U.S. Pat. No. 2,720,827 issued Oct. 18, 1955, discloses a broiler having a pair of grids or racks which are tilted toward the center from each side wall of the broiler unit. The grids converge at the center of the broiler and drain into a V-shaped trough which extends from the front to the rear of the broiler. This trough is sloped downwardly from the rear to the front of the broiler unit and routes the greases into a receptacle which extends across the front of the broiler unit.

H. E. Happel et al, in U.S. Pat. No. 3,444,805 issued May 20, 1969, teach a drop-in countertop grill having proximity ventilation. The bottom of the burner box is formed to define an angularly disposed drip pan which terminates in a channel at its lowest point across the front of the pan. The channel has a drain aperture above a funnel which passes through the rough-in box. The funnel extends into the lid of a mason jar secured to the underside of the rough-in box. When the mason jar is full of grease it is removed and disposed of and a new jar is attached to the lid in its place.

The known prior art has thus recognized the desirability of collecting grease generated during broiling or grilling of food products. There has not been, however, any known showing of a rang having a top mounted grill and a grease collection system with a collection container normally concealed by the closed oven door. The collection container provides for visually checking the grease level and also provides for overflow along the front of the container for ease of cleaning.

SUMMARY OF THE INVENTION

It is therefore an object of the instant invention to provide an improved grease collection system for a range having grilling capability.

It is a further object of the instant invention to provide a grease collection system having an easily accessible and removable container with built-in sight window and overflow control.

It is a still further object of the instant invention to provide a grease collection system wherein the container is hidden from view when the oven door is closed.

Briefly, the instant invention achieves these objects in a grease collection system for a range having grilling capability. The range cabinet includes a generally horizontal top surface and a generally vertically disposed front panel having an outer door portion and an inner panel portion defining an oven cavity opening closed by the outer door portion. Grilling apparatus is associated with the top surface of the range cabinet for grilling food products. Apparatus is provided which includes a sump for catching grease generated during grilling. A container is spaced from the sump for collecting the grease. The inner panel portion of the front panel also defines a secondary opening juxtaposed to the oven cavity opening. The container is disposed in the secondary opening and has a front wall portion which is generally flush with the substantially vertical plane of the inner panel portion. A conduit extends from the sump to the container for conducting the grease therebetween.

Operation and construction of the grease collection system and further objects and advantages thereof will become evident as the description proceeds and from an examination of the accompanying three sheets of drawings.

BRIEF DESCRIPTION OF THE DRAWINGS

The drawings illustrate a preferred embodiment of the invention with similar numerals referring to similar parts throughout the several views, wherein:

FIG. 3 is a fragmentary section view taken generally along lines 3—3 of FIG. 2;

FIG. 4 is a section view taken generally along lines 4—4 of FIG. 3;

FIG. 5 is a view of the grease collection container as normally mounted in the inner panel portion of the range;

FIG. 6 is a section view taken generally along lines 6—6 of FIG. 5;

FIG. 7 is a view similar to FIG. 3 and showing pivotal movement of the grease container for installation and removal; and FIG. 8 is a partial fragmentary section of the top of the grease container with a portion of the container front panel removed to show the overflow drain aperture in the front wall of the container.

DESCRIPTION OF A PREFERRED EMBODIMENT

Figure 1:
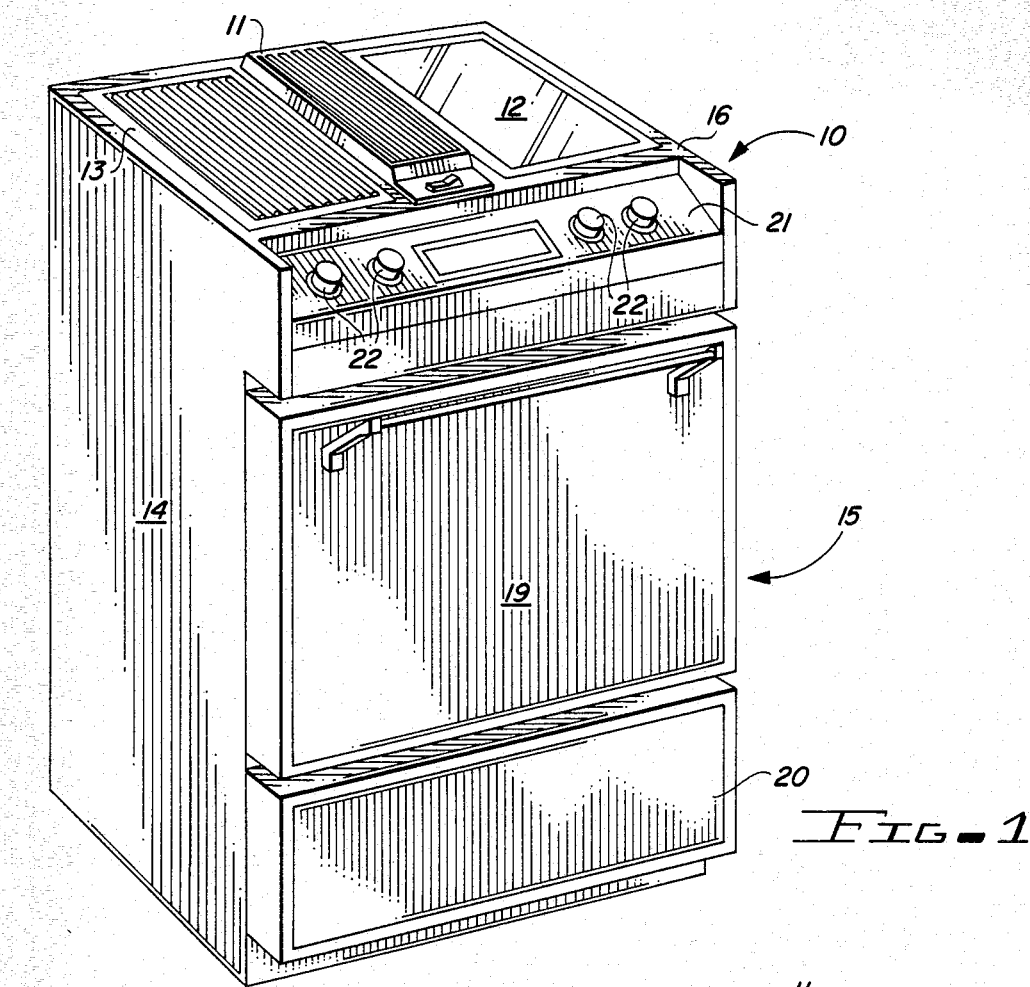
FIG. 1 is a pictorial view of a free-standing proximity ventilated range.

Referring now to the drawings and in particular to FIG. 1, there is shown a free-standing range or stove 10 of the type incorporating proximity ventilation and with a centrally located air intake 11. The range 10 shown in FIG. 1 utilizes interchangeable plug-in modular cooktop cartridges. These interchangeable cooktop cartridges are illustrated herein as a smooth cooktop unit 12 on the right and a grilling unit 13 on the left but can also include a variety of other cooking accessories as well as conventional heating elements.

Figure 2:
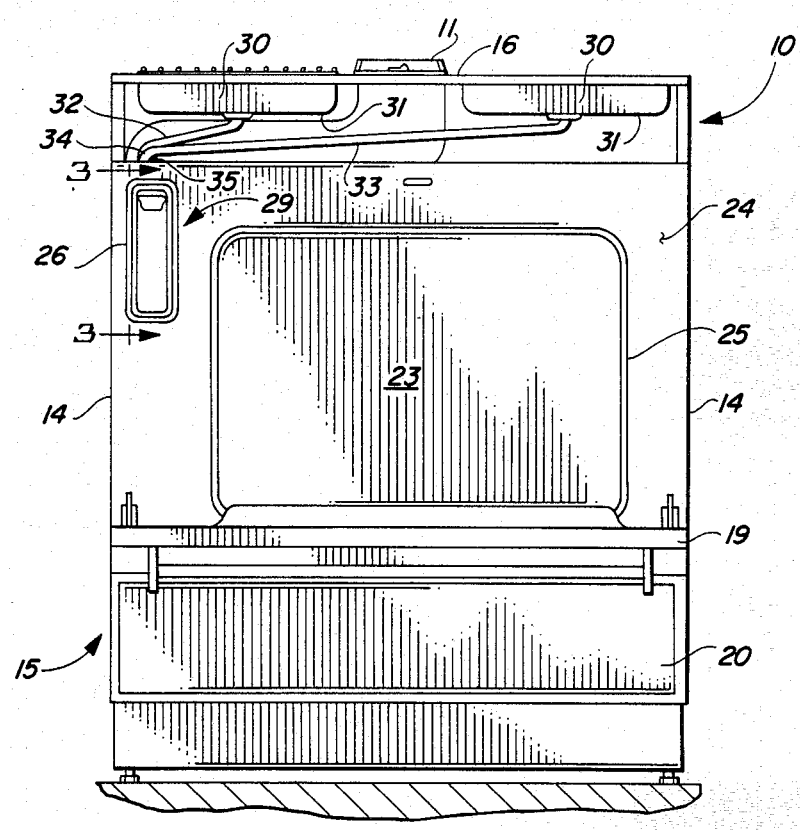
FIG. 2 is a front elevation view of the range of FIG. 1 with the control panel removed and the oven door open.

The range 10 as shown in FIGS. 1 and 2 includes a generally rectangular cabinet having substantially vertically disposed side and front panels 14 and 15 and a generally horizontally disposed top surface 16. The cabinet portion generally designated as front panel 15 is comprised of a forwardly opening oven door 19 and a forwardly opening access door 20 which is disposed directly below the oven door 19. Also, as shown in FIG. 1, a control pane 21 is generally associated with the front panel 15 and includes a plurality of knobs 22 for providing individual control and operation of the cooktop cartridges 12 and 13 and of the oven 23.

FIG. 2 shows the range 10 with the oven door 19 in the open posture and with the control panel 21 removed. The inner pane portion 24 of the range 10, shown in FIG. 2, includes a pair of openings 25 and 26. A large generally centrally located opening defines the oven cavity opening 25 and a substantially smaller secondary opening 26 is disposed in the upper left-hand corner of the inner panel portion 24 for receiving a grease collector 29 which is readily removable when the oven door 19 is open. When the oven door 19 is closed the grease collector 29 is hidden from view.

As best shown in FIG. 2, each of the cooktop cartridges 12 or 13 is supported on the top surface 16 overlying a pair of drip pans 30 on each side of the proximity ventilation air intake 11. The drip pans 30 are constructed so that the bottom surface 31 slopes downwardly from the rear of the range 10 toward the front so that any grease generated by grilling food products will natural drain toward a sump area at the front of the drip pan 30. As further shown in FIG. 2, a pair of conduits 32 and 33 extend from the sum areas of the drip pans 30 and have outlet ends 34 and 35 directly overlying the open top of the grease collector 29 as shown in FIG. 3. Thus the grilling unit 13 may be accommodated in either of the drip pans 30.

As best shown in FIGS. 3, 4 and 7, the secondary opening 26 in the inner panel portion 24 of the range 10 is, in this embodiment of the invention, a vertically elongated rectangular opening spaced below the outlet ends 34 and 35 of the conduits 32 and 33. The top and bottom edges of the opening 26 are fabricated to provide a pair of rearwardly extending flanges 36 and 39. Each of the vertically disposed sides 40 of the rectangular opening 26 extend rearwardly for a predetermined distance and then turn in to form a pair of rearwardly spaced flanges 41. The vertically elongated rectangular opening 26 thus includes upper and lower flanges 36 and 39 and a rearwardly spaced generally narrower opening defined by the flanges 41.

As further shown in the various views of FIGS. 3-8, the open top substantially rectangular grease collector 29 is mounted within the rectangular opening 26 for receiving grease generated when grilling foods. The grease collector 29, in this embodiment of the invention, is of a two-piece construction including a thermoplastic grease container 42 and a stainless steel front panel 43 which is visibly compatible with the material of the inner panel portion 24.

The thermoplastic grease container 42 includes a step portion 44 at its lower front corner, as best shown in FIG. 3, which is engageable with and rests upon the lower flange 39 of the rectangular opening 26 when inserted therein. The stainless steel front panel 43 is secured to the front of the grease container 42 by upper and lower tabs 45 and 46 which are bent over the top and bottom edges of the front wall 49 of the grease container 42 as best shown in FIGS. 3 and 7. The center section 50 of the front panel 43 is rearwardly formed to engage with the front wall 49 of the grease container 42. As shown in FIGS. 4 and 5, the upper portion of the front panel 43 extends forwardly to define a finger hold handle 51 for aiding installation and removal of the grease collector 29 from the rectangular opening 26. Each side wall 52 of the front panel 43 is rearwardly formed and, as shown in FIGS. 4 and 6, contacts the pair of rearwardly spaced flanges 41. Therefore the combination of lower flange 39 and rearwardly spaced flanges 41 maintains the grease collector 29 properly disposed within the rectangular opening 26.

As best shown in FIG. 5, the stainless steel front panel 43 is removed above the rearwardly formed center section 50 and below the handle 51 to define a window sight gauge area 53. The particular thermoplastic material used for the grease container 42 is naturally translucent and the level of grease will be readily visible through the window or sight gauge area 53.

In FIG. 8, the upper portion of the stainless steel front panel 43 has been removed to show an overflow aperture 54 in the front wall 49 of the grease container 42. The lower edge 55 of this aperture 54 is spaced below the top edge 59 of the grease container 42 so that grease will tend to flow over the lower edge 55 of the aperture 54 and down the front of the inner panel portion 24 for detection by the operator and for easy clean up rather than overflowing within the range 10. This aperture 54 is normally hidden from view behind the handle 51. It is noted while this embodiment of the invention utilizes a two-piece grease collector 29 the grease collector 29 could be molded in one piece.

As shown in FIG. 3, when the grease collector 29 is positioned within the rectangular opening 26, the front panel 43 of the grease collector 29 is spaced slightly behind the plane of the inner panel portion 24 and the handle 51 extends slightly forward of that plane. As shown in FIG. 7, the grease collector 29 will pivot on the lower flange 39 and can be lifted by the handle 51 to clear the step portion 44 and then can be pulled forward to be removed from the rectangular opening 26. If the grease collector 29 is dropped when in the posture of FIG. 7, the weight of the grease collector 29 and/or grease collected therein will cause the grease collector 29 to pivot overcenter in a counterclockwise direction about the lower flange 39 and remain within the rectangular opening 26.

When the oven door of the range is closed the grease collector is completely hidden from view. When the oven door is open the rectangular front panel is visible which includes a window for determining at a glance whether or not the grease collector needs to be emptied. There is thus provided a grease collection system which is aesthetically pleasing, easily cleaned and serviced, has a window for determining the grease level, provides for controlled overflow and includes a built-in handle.

In this specification grease is used but it is understood that the term "grease" is intended to include other fluids produced or released in the grilling process.

In the drawings and specification, there has been set forth a preferred embodiment of the invention and although specific terms are employed these are used in a generic and descriptive sense only and not for purposes of limitation. Changes in the form and the proportion of parts as well as the substitution of equivalents are contemplated as circumstances may suggest or render expedient without departing from the spirit or scope of the invention as further defined in the following claims.

I claim:

1. A grease collection system for a range having grilling capability, comprising: range cabinet means including a generally horizontally disposed top surface and a generally vertically disposed front panel means, said front panel means including an outer door portion and an inner panel portion which defines an oven cavity opening and a secondary opening juxtaposed to said oven cavity opening, said outer door portion being operable to a closed position for covering said oven cavity opening and said secondary opening; means associated with said top surface of said range cabinet means for grilling food products; sump means for catching grease generated during grilling; container means disposed in said secondary opening and having a front wall portion generally flush with the substantially vertical plane of said inner panel portion; and means extending from said sump means to said container means for conducting said grease therebetween.

2. A grease collection system as defined in claim 1 wherein said container means includes means for observing the level of the collected grease in said container means.

3. A grease collection system as defined in claim 1 wherein said container means includes a receptacle portion formed to prevent the overflow of collected greases behind said front wall portion.

4. A grease collection system as defined in claim 1 wherein said secondary opening includes bottom flange means and wherein a portion of said container means is formed to engage with and pivot overcenter on said bottom flange means toward said secondary opening when said container is installed or removed from said secondary opening.

5. A grease collection system as defined in claim 1 wherein said container means includes a thermoplastic receptacle portion and a metallic front panel portion having formed handle means.

6. A grease collection system for a range having grilling capability, comprising: range cabinet means including a generally horizontally disposed top surface and a generally vertically disposed front panel means, said front panel means including an outer door portion and an inner panel portion which defines an oven cavity opening and a secondary opening juxtaposed to said oven cavity opening, said outer door portion being operable to a closed position for covering said oven cavity opening and said secondary opening; means associated with said top surface of said range cabinet means for grilling food products; sump means for catching grease generated during grilling; container means disposed in said secondary opening and having a front wall portion generally flush with the substantially vertical plane of said inner panel portion and defining means for observing the level of collected grease in said container means; and means extending from said sump means to said container means for conducting said grease therebetween.

7. A grease collection system as defined in claim 6 wherein said container means includes a thermoplastic receptacle portion and a metallic front panel portion having window means for viewing the level of collected grease in said container means through the thermoplastic wall.

8. A grease collection system as defined in claim 6 wherein said container means includes a receptacle portion having rear walls preventing overflow of grease behind said front wall portion and includes a recess permitting overflow of grease on said front wall as a signal that the container means should be emptied.

9. A grease collection system as in claim 6 wherein said secondary opening includes bottom flange means and wherein a portion of said container means is formed to engage with and pivot over-center on said bottom flange means toward said secondary opening when said container means is installed or removed from said secondary opening.

10. A grease collection system for a range having grilling capability, comprising: range cabinet means including a generally horizontally disposed top surface and a generally vertically disposed front panel means, said front panel means including an outer door portion and an inner panel portion which defines an oven cavity opening and a secondary opening juxtaposed to said oven cavity opening, said outer door portion being operable to a closed position for covering oven cavity opening and said secondary opening; means associated with said top surface of said range cabinet means for grilling food products; sump means for catching grease generated during grilling; container means disposed in said secondary opening, said container means including an imperforate receptacle member and a front wall member, said front wall member including a first portion generally flush with the substantially vertical plane of said inner panel portion and a second portion defining a handle; and means extending from said sump means to said container means for conducting said grease therebetween.

11. A grease collection system as defined in claim 10 wherein said receptacle member includes rear walls that extend to a vertical height above a recess in said front wall whereby overflow of grease from the container behind the front wall is prevented.

12. A grease collection system as defined in claim 10 wherein said receptacle member permits the viewing of the level of grease therein and wherein said front wall member contains a window exposing the front wall of the receptacle member for level viewing.

* * * * *

UNITED STATES PATENT AND TRADEMARK OFFICE
CERTIFICATE OF CORRECTION

PATENT NO. : 4,517,886
DATED : May 21, 1985
INVENTOR(S) : Michael E. Bales

It is certified that error appears in the above–identified patent and that said Letters Patent are hereby corrected as shown below:

| | |
|---|---|
| Col. 1, line 63 | "rang" should be -- range -- |
| Col. 3, line 16 | "pane" should be -- panel -- |
| Col. 3, line 22 | "pane" should be -- panel -- |
| Col. 3, line 38 | "natural" should be -- naturally -- |
| Col. 3, line 40 | "sum" should be -- sump -- |

Signed and Sealed this

Twenty-fourth Day of September 1985

[SEAL]

Attest:

Attesting Officer

DONALD J. QUIGG

Commissioner of Patents and Trademarks—Designate